United States Patent
Li et al.

(10) Patent No.: US 10,488,960 B2
(45) Date of Patent: Nov. 26, 2019

(54) ELECTRONIC DEVICE, TOUCH DISPLAY PANEL AND TOUCH DISPLAY SUBSTRATE

(71) Applicants: SHANGHAI TIANMA MICRO-ELECTRONICS CO., LTD., Shanghai (CN); TIANMA MICRO-ELECTRONICS CO., LTD, Shenzhen (CN)

(72) Inventors: Gujun Li, Shanghai (CN); Yungang Sun, Shanghai (CN); Lingxiao Du, Shanghai (CN); Conghua Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 109 days.

(21) Appl. No.: 15/000,829

(22) Filed: Jan. 19, 2016

(65) Prior Publication Data

US 2016/0291756 A1    Oct. 6, 2016

(30) Foreign Application Priority Data

Apr. 1, 2015   (CN) .......................... 2015 1 0153208

(51) Int. Cl.
  *G06F 3/041*   (2006.01)
  *G02F 1/1333*  (2006.01)
  (Continued)

(52) U.S. Cl.
  CPC ........ *G06F 3/0412* (2013.01); *G02F 1/13338* (2013.01); *G06F 3/044* (2013.01);
  (Continued)

(58) Field of Classification Search
  CPC ...... G06F 3/041; G06F 3/0412; G06F 3/0416; G06F 3/044; G06F 2203/04107;
  (Continued)

(56) References Cited

U.S. PATENT DOCUMENTS

2010/0053093 A1* 3/2010 Kong ...................... G06F 3/041
                                                         345/173
2011/0193799 A1   8/2011 Jun et al.
(Continued)

FOREIGN PATENT DOCUMENTS

CN    102467303 B    5/2012
CN    102479011 A    5/2012
(Continued)

OTHER PUBLICATIONS

Chinese Application No. 201510153208.1, First Office Action dated Mar. 20, 2017.

*Primary Examiner* — Wing H Chow
(74) *Attorney, Agent, or Firm* — Alston & Bird LLP

(57) ABSTRACT

An electronic device, a touch display panel and a touch display substrate are provided. The touch display substrate includes a substrate plate and a common electrode layer disposed on the substrate plate, where the common electrode layer includes multiple touch display electrodes insulated from each other, and the touch display electrodes are arranged in an array, and multiple touch display wires insulated from each other, where the touch display wires and the touch display electrodes are arranged and connected electrically according to a one-to-one correspondence. Areas of at least two touch display electrodes increase gradually in a first direction, and the first direction is an extending direction of the touch display wire and extends from a contact point between the touch display wire and the touch display electrode to an edge of the substrate plate.

6 Claims, 5 Drawing Sheets

(51) Int. Cl.
*G06F 3/044* (2006.01)
*G02F 1/1362* (2006.01)
(52) U.S. Cl.
CPC ............. *G02F 1/136286* (2013.01); *G06F 2203/04107* (2013.01)
(58) Field of Classification Search
CPC .... G02F 1/133; G02F 1/1333; G02F 1/13338; G02F 1/13306; G02F 1/136286; G02F 2203/04107
See application file for complete search history.

(56) References Cited

U.S. PATENT DOCUMENTS

| | | | |
|---|---|---|---|
| 2012/0012450 A1* | 1/2012 | Liu | G06F 3/044 200/600 |
| 2012/0133613 A1 | 5/2012 | Chen et al. | |
| 2013/0100058 A1* | 4/2013 | Lin | G06F 3/0412 345/173 |
| 2013/0147724 A1* | 6/2013 | Hwang | G06F 3/0412 345/173 |
| 2014/0118277 A1* | 5/2014 | Kim | G06F 3/044 345/173 |
| 2014/0238834 A1* | 8/2014 | Heim | H03K 17/9622 200/600 |
| 2016/0259445 A1 | 9/2016 | Yang et al. | |
| 2016/0294386 A1 | 10/2016 | Yang et al. | |

FOREIGN PATENT DOCUMENTS

| | | |
|---|---|---|
| CN | 103257778 A | 8/2013 |
| CN | 104020906 A | 9/2014 |
| CN | 104022127 A | 9/2014 |
| CN | 104022128 A | 9/2014 |
| CN | 104216564 A | 12/2014 |

\* cited by examiner

ELECTRONIC DEVICE, TOUCH DISPLAY PANEL AND TOUCH DISPLAY SUBSTRATE

CROSS REFERENCE OF RELATED APPLICATION

The present application claims priority to Chinese Patent Application No. 201510153208.1, entitled "ELECTRONIC DEVICE, TOUCH DISPLAY PANEL AND TOUCH DISPLAY SUBSTRATE", filed on Apr. 1, 2015 with the State Intellectual Property Office of the PRC, which is incorporated herein by reference in its entirety.

BACKGROUND

At earlier phases of development of touch display technologies, touch display panels are formed by attaching a touch panel to a display panel, to achieve a touch display function. The touch panel and the display panel need to be manufactured separately. In turn, this results in a high manufacturing cost, large thickness, and low production efficiency.

With the development of touch-display integration technology, a common electrode in the array substrate of the display panel can function as touch sensing electrodes for touch detection, a touch control and a display control. These functions are performed in a time-division manner by a time-division driving, to achieve touch and display functionality. Therefore, the touch sensing electrodes are integrated in the display panel, and accordingly, the cost is decreased, the production efficiency is improved, and the thickness of the panel is reduced.

In a case that the common electrode further serves as touch sensing electrodes, a common electrode layer may be divided into multiple touch display electrodes. To achieve the touch control and the display control in a time-division manner, a voltage signal is provided to each of the touch display electrodes through an individual wire, touch sensing signals are provided to corresponding touch display electrodes through the wires in a touch stage, and display driving voltages are provided to corresponding touch display electrodes through the wires in a display stage.

Although the conventional touch display panel has the touch function and the display function, the accuracy of touch detection is poor.

SUMMARY

This specification relates to an electronic device, a touch display panel and a touch display substrate. An electronic device, a touch display panel and a touch display substrate are provided according to the present disclosure, to improve the accuracy of touch detection.

To achieve the above improvements, the following technical solutions are provided according to the present disclosure. A touch display substrate, which includes: a substrate plate; a common electrode layer and multiple touch display wires disposed above the substrate plate, where the multiple touch display wires are insulated from each other; where the common electrode layer includes multiple touch display electrodes insulated from each other, and the touch display electrodes are arranged in an array; and the touch display wires and the touch display electrodes are arranged and connected electrically according to a one-to-one correspondence between the touch display wires and the touch display electrodes, areas of at least two touch display electrodes increase gradually along a first direction, and the first direction is an extending direction of the touch display wire and extends from a contact point between the touch display wire and the touch display electrode to an edge of the substrate plate. The specification further provides a touch display substrate, which includes: a substrate plate; a common electrode layer disposed on the substrate plate, where the common electrode layer includes multiple touch display electrodes insulated from each other, and the touch display electrodes are arranged in an array; and multiple touch display wires insulated from each other, where the touch display wires and the touch display electrodes are arranged and connected electrically according to a one-to-one correspondence between the touch display wires and the touch display electrodes, and a total capacitance of one touch display electrode and a touch display wire corresponding to the one touch display electrode is equal to a total capacitance of another touch display electrode and a touch display wire corresponding to the another touch display electrode.

The specification further provides a touch display panel according to the present disclosure, which includes: a first substrate and a second substrate disposed opposite to the first substrate; and a liquid crystal layer disposed between the first substrate and the second substrate; where the first substrate is the touch display substrate described above.

The specification further provides an electronic device, which includes a driving circuit and the touch display panel described above.

From the above description, in the touch display substrate, the touch display panel, and the electronic device according to the disclosure, the areas of the touch display electrodes increase in the first direction, such that a total capacitances of one touch display electrode and corresponding touch display wire(s) is approximately equal to that of another display electrode and corresponding touch display wire(s), thereby decreasing difference between the touch capacitances of two touch display units adjacent in the first direction and improving the accuracy of touch detection.

BRIEF DESCRIPTION OF THE DRAWINGS

To illustrate technical solutions according to embodiments of the present disclosure or in the conventional technologies more clearly, drawings to be used in the descriptions of the conventional technologies or the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF EMBODIMENTS

Technical solutions in embodiments of the present disclosure are described clearly and completely hereinafter in conjunction with the drawings in the embodiments of the present disclosure. Apparently, the described embodiments are only a part rather than all of the embodiments of the present application. All the other embodiments obtained by those skilled in the art without creative effort on the basis of the embodiments of the present disclosure fall within the scope of protection of the present disclosure.

Figure 1:
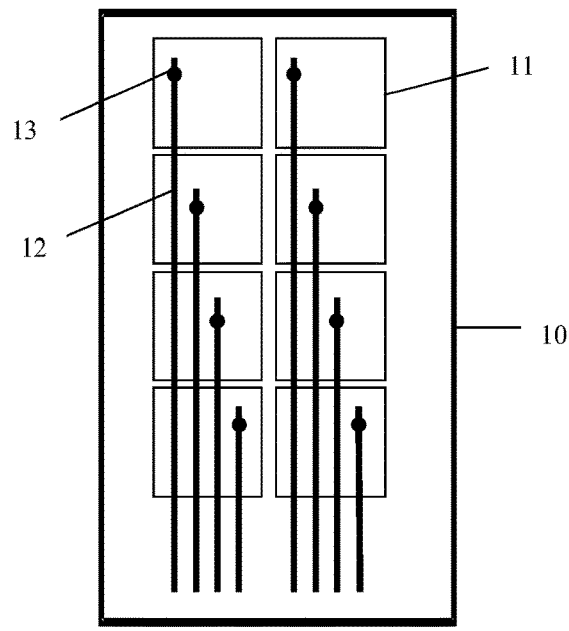
FIG. 1 is a schematic structural diagram of a conventional touch display substrate.

Reference is made to FIG. 1, which is a schematic structural diagram of a conventional touch display substrate. The touch display substrate includes: a substrate plate 10, and a common electrode layer and a touch display wire layer each disposed above the substrate plate 10. The common electrode layer is disposed opposite to the touch display wire layer, and an insulating layer is disposed between the common electrode layer and the touch display wire layer. The common electrode layer includes multiple touch display electrodes 11 arranged in an array. The touch display wire layer includes multiple touch display wires 12. The touch display wires 12 extend, along a same direction, to a same edge of the substrate plate, which is convenient for binding a chip. The touch display wires 12 are electrically connected to the touch display electrodes 11 through via holes 13, and there is a one-to-one correspondence between the touch display wires 12 and the touch display electrodes 11.

In a case that one touch display electrode 11 and the touch display wire 12 connected to the touch display electrode 11 are defined as one touch display unit, a coupling capacitor is formed between one touch display unit and the touch display wire of another touch display unit in the conventional touch display substrate. The coupling capacitances for the respective touch display units are different since the lengths of the touch display wires corresponding to the touch display units are different in the vertical direction shown in FIG. 1.

In one column of touch display electrodes, the touch display electrodes have the same size, along an extending direction of the touch display wire 12 (from an upper portion to a lower portion as shown in FIG. 1), the number of the touch display wire(s) 12 of other touch display units overlapping one touch display unit gradually increases, and accordingly, along the extending direction of the touch display wire 12, coupling capacitances of the touch display units gradually increase. Taking a self-capacitive touch detection as an example, a touch detection capacitance includes a capacitance (reference capacitance) between a touch display unit being touched and a finger, and the coupling capacitance of the touch display unit. For one touch display unit, it can be equivalently understood that a touch display electrode is shared as a common substrate by a reference capacitor and a coupling capacitor, that is, the reference capacitor and the corresponding coupling capacitor are connected in series, and the total capacitance (touch detection capacitance) of the reference capacitor and the coupling capacitor decreases as the coupling capacitance increases. Consequently, touch detection capacitances gradually decrease in the extending direction of the touch display wire.

In this case, touch detection capacitances of the touch display units in the vertical direction vary and gradually decrease in the extending direction, thereby resulting in a low accuracy of the touch detection.

In view of the above problems, the specification provides a touch display substrate herein. The touch display substrate includes a substrate plate; and a common electrode layer and multiple touch display wires disposed above the substrate plate, where the multiple touch display wires are insulated from each other. The touch display wires are manufactured through one metal layer. The common electrode layer is disposed in the same layer with the metal layer.

The common electrode layer includes multiple touch display electrodes insulated from each other, and the touch display electrodes are arranged in an array. The touch display wires and the touch display electrodes are provided and connected electrically according to a one-to-one correspondence.

Areas of at least two touch display electrodes are gradually increased in a first direction, and the first direction is an extending direction of the touch display wire and extends from a contact point between the touch display wire and the touch display electrode to an edge of the substrate plate.

In the touch display substrate according to the present application, for one column of touch display electrodes, the areas of the touch display electrodes increase gradually in the first direction, and accordingly, the reference capacitances increase gradually, and differences between the touch detection capacitances of the touch display units are reduced or the touch detection capacitances of the touch display units are equal. For one touch display unit, a touch detection capacitance C is indicated as follows:

$$C = \frac{C_2}{1 + \frac{C_2}{C_1}}.$$

Where, $C_1$ represents a reference capacitance, and $C_2$ represents a coupling capacitance. The coupling capacitance mainly depends on the number of the touch display wires being coupled. For any one touch display unit, in the case that the number of the touch display wires coupled to the touch display unit remains unchanged, a change of the coupling capacitance due to a change of the area of the touch display electrode is not taken into consideration, and $C_2$ is a constant accordingly; and the touch detection capacitance increases as the area of the touch display electrode increases. Therefore, the touch detection capacitances increase gradually since the areas of the touch display electrodes increase gradually in the first direction, and the changing trend of the touch detection capacitances is opposite to the decreasing of the touch detection capacitances due to the different coupling capacitances in the first direction. Therefore differences between the touch detection capacitances of the touch display units along the first direction are reduced or the touch detection capacitances of the touch display units are equal, thereby improving the accuracy of the touch detection.

Figure 2:
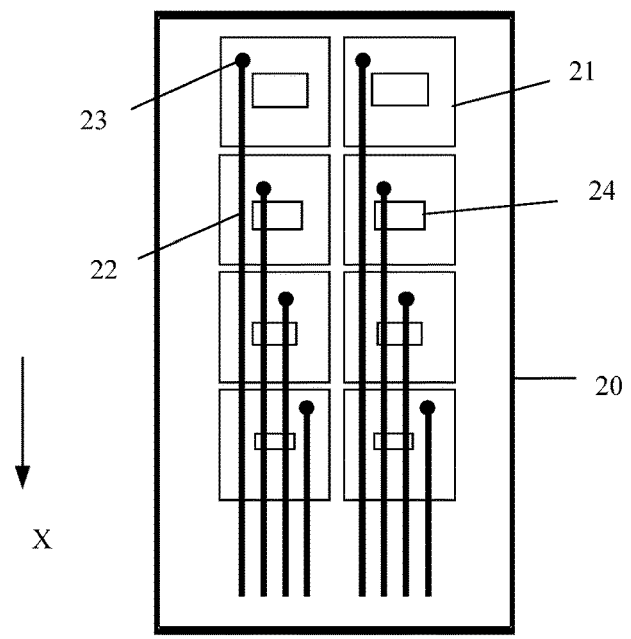
FIG. 2 is a schematic structural diagram of a touch display substrate according to an embodiment of the present application.

A touch display substrate according to an embodiment of the application is shown in FIG. 2, which is a schematic structural diagram of a touch display substrate according to an embodiment of the present application. In the touch display substrate shown in FIG. 2, a common electrode layer and multiple touch display wires 22 are disposed above a substrate plate 20. The common electrode layer includes multiple touch display electrodes 21, which are respectively connected to the touch display wires 22 through via holes 23. The extending direction of the touch display wire 22 is a first direction X.

In the embodiment shown in FIG. 2, the touch display electrodes 21 are rectangle electrodes of the same length and the same width, and an opening 24 is disposed in each of the rectangle electrodes. The areas of the openings 24 gradually decrease along the first direction X, such that the areas of the touch display electrodes 21 increase gradually. The opening 24 has a regular planar geometrical shape or an irregular planar geometrical shape, for example, the opening 24 may be in a shape of a triangle, a rectangle, a circle, an ellipse an irregular planar polygon and/or the like.

Figure 3:
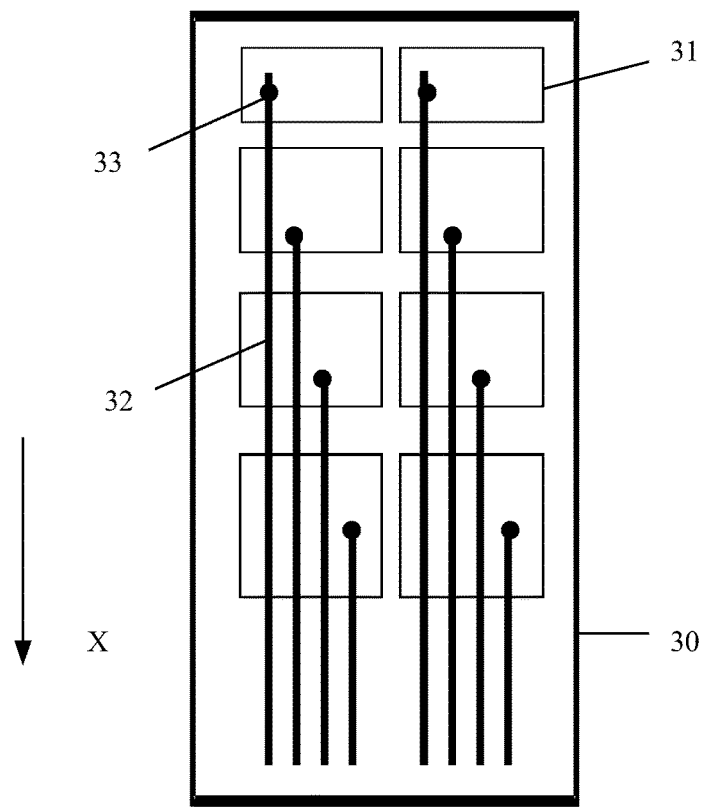
FIG. 3 is a schematic structural diagram of a touch display substrate according to an embodiment of the present application.

A touch display substrate according to an embodiment of the application is shown in FIG. 3, which is a schematic structural diagram of a touch display substrate according to an embodiment of the present application. In an array substrate shown in FIG. 3, a common electrode layer and multiple touch display wires 32 are disposed on a substrate plate 30. The common electrode layer includes multiple touch display electrodes 31, which are respectively connected to the touch display wires 32 through via holes 33. The touch display electrodes 31 are arranged as rectangle electrodes, and for one column of touch display electrodes, the lengths of vertical edges of the touch display electrodes 31 increase gradually, and the widths of horizontal edges of the touch display electrodes are identical, where the vertical edges are in the first direction X and the horizontal edges are perpendicular to the first direction; with such arrangement, the areas of the touch display electrodes 31 increase gradually in the first direction X.

According to the embodiments shown in FIG. 2 and FIG. 3, the areas of the touch display electrodes increase in the first direction X, and accordingly, difference between the touch detection capacitances of two touch display units is decreased, thereby improving the accuracy of the touch detection. Compared with the embodiment shown in FIG. 2, it is not necessary to etch openings in the touch display electrodes 31 in the embodiment shown in FIG. 3, thereby simplifying manufacture process and in turn reducing costs.

The touch display substrate according to the embodiments of the present application may be an array substrate. In this case, the touch display substrate further includes: a thin film transistor; a gate line connected to a gate of the thin film transistor; a data line connected to a source of the thin film transistor, and a pixel electrode connected to a drain of the thin film transistor.

Figure 4:
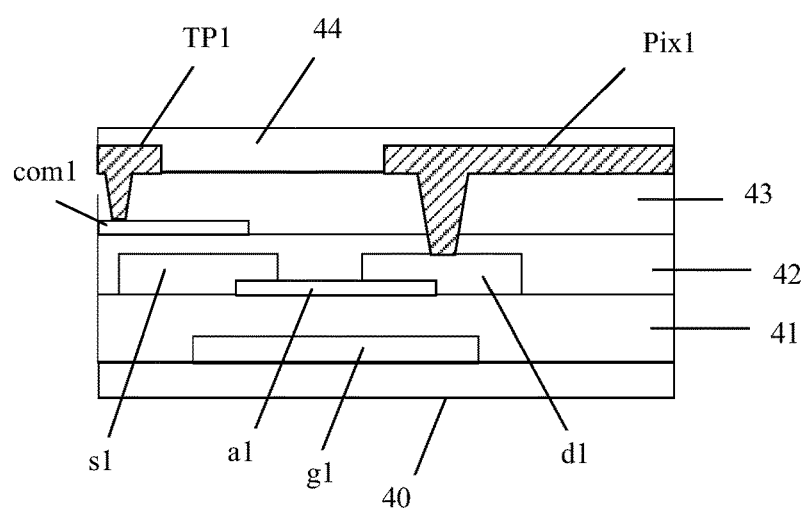
FIG. 4 is a schematic structural diagram of a touch display substrate according to an embodiment of the present application.

In a case that the touch display substrate is an array substrate, a structure of the touch display substrate may be shown in FIG. 4, which is a schematic structural diagram of a touch display substrate according to an embodiment of the present application. A thin film transistor is disposed in the array substrate and is disposed on a surface of a substrate plate 40. The thin film transistor includes: a gate g1 and a gate line (not shown in FIG. 4) disposed on a surface of the substrate plate 40; a gate dielectric layer 41 covering the gate g1 and the gate line; and an active region a1, a source s1 and a drain d1 disposed on a surface of the gate dielectric layer 41. A data line (not shown in FIG. 4) connected to the source s1 is disposed on a surface of the gate dielectric layer 41, and the data line is disposed in the same layer with the source s1.

In the touch display substrate shown in FIG. 4, the thin film transistor is disposed on a surface of the substrate plate 40; a first insulating layer 42 is provided covering the thin film transistor; a common electrode layer com1 is disposed on a surface of the first insulating layer 42, and a second insulating layer 43 is disposed on a surface of the common electrode layer com1; and a touch display wire TP1 and a pixel electrode Pix1 are disposed on a surface of the second insulating layer 43, and the pixel electrode Pix1 is electrically connected to the drain d1 of the thin film transistor through a via hole. The touch display wire TP1 is electrically connected, through a via hole, to a touch display electrode corresponding to the common electrode layer com1.

In the embodiment shown in FIG. 4, the touch display wire TP1 and the pixel electrode Pix1 are disposed in the same layer and can be manufactured simultaneously through one conductive layer, thereby simplifying manufacturing process and reducing manufacturing costs. A third insulating layer 44 is disposed on the touch display wire TP1 and the pixel electrode Pix1. A wire shielding electrode (not shown in FIG. 4) may be disposed on the third insulating layer 44 and be partially overlapped with the touch display wire TP1, to protect the touch display wire TP1 from electromagnetic interference.

Figure 5:
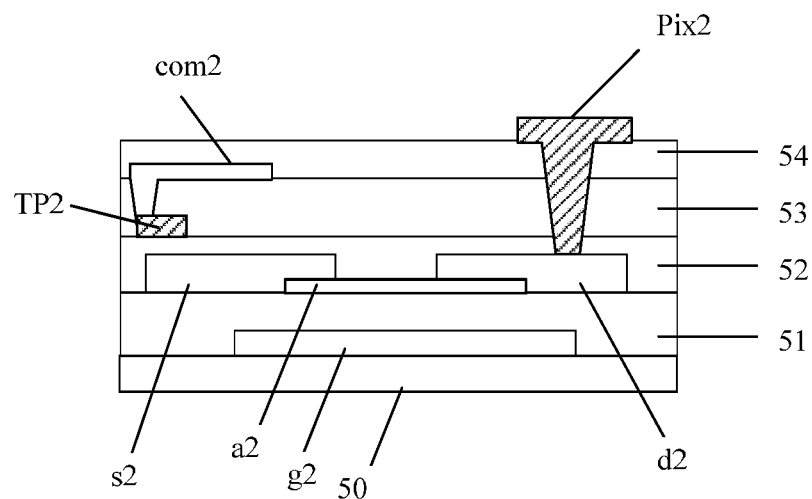
FIG. 5 is a schematic structural diagram of a touch display substrate according to an embodiment of the present application.

In a case that the touch display substrate is an array substrate, a structure of the touch display substrate may be shown in FIG. 5, which is a schematic structural diagram of a touch display substrate according to another embodiment of the present application. A thin film transistor is disposed in the array substrate and is disposed on a surface of a substrate plate 50. The thin film transistor includes: a gate g2 and a gate line (not shown in FIG. 5) disposed on a surface of the substrate plate 50; a gate dielectric layer 51 covering the gate g2 and the gate line; and an active region a2, a source s2 and a drain d2 disposed on a surface of the gate dielectric layer 51. A data line (not shown in FIG. 5) connected to the source s2 is disposed on a surface of the gate dielectric layer 51, and the data line is disposed in the same layer with the source s2.

In the touch display substrate shown in FIG. 5, the thin film transistor is disposed on a surface of the substrate plate 50; a first insulating layer 52 is provided covering the thin film transistor; a touch display wire TP2 is disposed on a surface of the first insulating layer 52, and a second insulating layer 53 is provided covering the touch display wire TP2; a common electrode layer com2 is disposed on a surface of the second insulating layer 53 and a third insulating layer 54 is disposed on a surface of the common electrode layer com2; a pixel electrode Pix2 is disposed on a surface of the third insulating layer 54 and is electrically connected to the drain d2 of the thin film transistor through a via hole. The touch display wire TP2 is electrically connected, through a via hole, to a touch display electrode corresponding to the common electrode layer com2.

A wire shielding electrode (not shown in FIG. 5) may be disposed over the touch display wire TP2 and is partially overlapped with the touch display wire TP2, to protect the touch display wire TP2 from electromagnetic interference. Specifically, the second insulating layer 53 may have a structure including two insulating layers, and the wire shielding electrode is disposed between the two insulating layers and is located over the touch display wire TP2.

Figure 6:
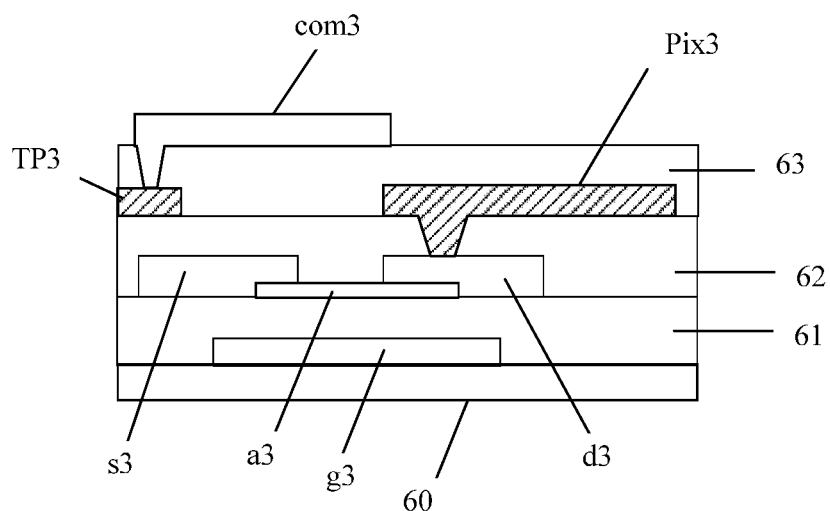
FIG. 6 is a schematic structural diagram of a touch display substrate according to an embodiment of the present application.

In a case that the touch display substrate is an array substrate, a structure of the touch display substrate may be shown in FIG. 6, which is a schematic structural diagram of a touch display substrate according to an embodiment of the present application. A thin film transistor is disposed in the array substrate and disposed on a surface of a substrate plate 60. The thin film transistor includes: a gate g3 and a gate line (not shown in FIG. 6) disposed on a surface of the substrate plate 60; a gate dielectric layer 61 covering the gate g3 and the gate line; and an active region a3, a source s3 and a drain d3 disposed on a surface of the gate dielectric layer 61. A data line (not shown in FIG. 6) connected to the source s3 is disposed on a surface of the gate dielectric layer 61, and the data line is disposed in the same layer with the source s3.

In the touch display substrate shown in FIG. 6, the thin film transistor is disposed on a surface of the substrate plate 60; a first insulating layer 62 is provided covering the thin film transistor; a touch display wire TP3 and a pixel electrode Pix3 are disposed on a surface of the first insulating layer 62, the pixel electrode Pix3 is electrically connected to the drain d3 of the thin film transistor through a via hole, and a second insulating layer 63 is disposed on surfaces of the touch display wire TP3 and the pixel electrode Pix3; and a common electrode layer com3 is disposed on a surface of the second insulating layer 63.

In the embodiment shown in FIG. 6, the touch display wire TP3 and the pixel electrode Pix3 are disposed in the same layer and can be manufactured simultaneously through one conductive layer, thereby simplifying manufacturing process and reducing manufacturing costs. A wire shielding electrode (not shown in FIG. 6) may be disposed over the touch display wire TP3 partially overlapped with the touch display wire TP3, to protect the touch display wire TP3 from electromagnetic interference. Specifically, the second insulating layer 63 may have a structure including two insulating layers, and the wire shielding electrode is disposed between the two insulating layers and is located over the touch display wire TP3.

In the touch display substrate according to the embodiments of the present application, the touch display wire is disposed to be overlapped with the data line or the gate line, that is, the touch display wire is disposed opposite to the data line or the gate line in the direction perpendicular to the substrate plate, such that the touch display substrate has a high opening ratio and a good light transmitting effect.

The touch display substrate according to the embodiments of the present application may be a color film substrate. In this case, the touch display substrate includes a color film layer.

Figure 7:
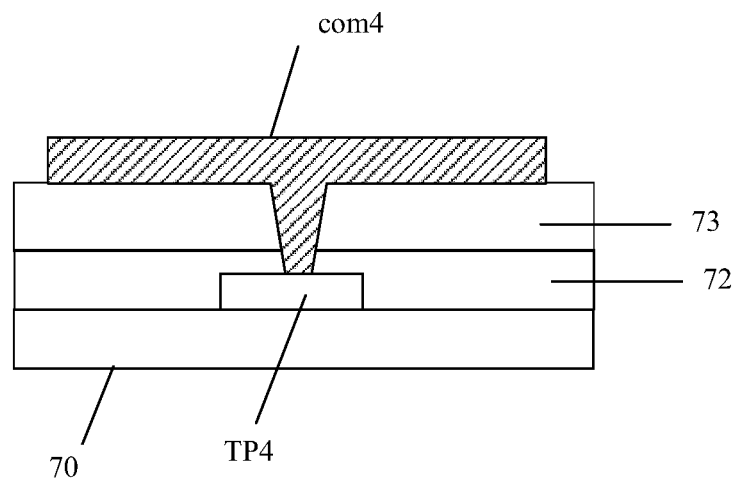
FIG. 7 is a schematic structural diagram of a touch display substrate according to an embodiment of the present application.

In a case that the touch display substrate is a color film substrate, a structure of the touch display substrate may be shown in FIG. 7, which is a schematic structural diagram of a touch display substrate according to an embodiment of the present application. In an array substrate shown in FIG. 7, a touch display wire TP4 is disposed on a surface of a substrate plate 70, an insulating layer 72 is provided covering the touch display wire TP4, a color film layer 73 is disposed on the insulating layer 72 and a common electrode layer com4 is disposed on the color film layer 73. The touch display wire TP4 is electrically connected, through the via hole, to a touch display electrode corresponding to the common electrode layer com4.

Figure 8:
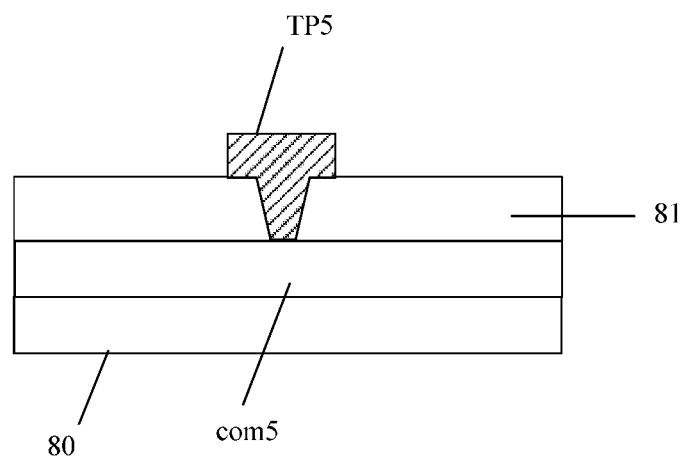
FIG. 8 is a schematic structural diagram of a touch display substrate according to an embodiment of the present application.

In a case that the touch display substrate is a color film substrate, a structure of the touch display substrate may be shown in FIG. 8, which is a schematic structural diagram of a touch display substrate according to an embodiment of the present application. In an array substrate shown in FIG. 8, a common electrode layer com5 is disposed on a surface of a substrate plate 80, color film layer 81 is disposed on a surface of the common electrode layer com5, and a touch display wire TP5 is disposed on a surface of the color film layer 81. The touch display wire TP5 is electrically connected, through a via hole, to a touch display electrode corresponding to the common electrode layer com5.

In the color film substrate shown in FIG. 7 to FIG. 8, a wire shielding electrode may be disposed for the touch display wire and be partially overlapped with the corresponding touch display wire.

No matter whether the touch display substrate is an array substrate or a color film substrate, in the case that the touch display substrate includes a wire shielding electrode disposed over the touch display wire, the wire shielding electrode is partially overlapped with the corresponding touch display wire. In addition, the wire shielding electrode is grounded to achieve a better electromagnetic shielding.

In the touch display substrate according to the embodiments of the present application, areas of touch display electrodes of touch display units can be adjusted such that difference between touch detection capacitances of any two touch display units adjacent in the first direction is not greater than 1%, thereby ensuring the accuracy of touch detection. In some implementations, the difference between the touch detection capacitances of any two touch display units adjacent in the first direction ranges from 0.2% to 0.5%. In one implementation, difference between areas of any two touch display units adjacent in the first direction is not greater than 4%. In some implementations the difference between the areas of any two touch display units adjacent in the first direction ranges from 0.2% to 3%.

The specification further provides a touch display substrate according to an embodiment of the present application, which includes a substrate plate; a common electrode layer disposed on the substrate plate, where the common electrode layer includes multiple touch display electrodes insulated from each other and the touch display electrodes are arranged in an array; and multiple touch display wires insulated from each other, where the touch display wires and the touch display electrodes are arranged and electrically connected according to a one-to-one correspondence between the touch display wires and the touch display electrodes.

Specifically, a total capacitance of one touch display electrode and a touch display wire corresponding to the one touch display electrode is equal to a total capacitance of another display electrode and a touch display wire corresponding to the another touch display electrode.

The touch display substrate may be an array substrate. In this case, the touch display substrate further includes: a thin film transistor, a gate line connected to the gate of the thin film transistor, and a data line connected to the source of the thin film transistor.

The touch display substrate may be a color film substrate. In this case, the touch display substrate further includes a color film layer.

The touch detection capacitances of the respective touch display units are the same. It can be seen from the description above that the accuracy of the touch detection is affected by the differences between touch detection capacitances of the touch display units. In any one of the above embodiments, the touch detection capacitances of the respective touch display units are the same, thereby achieving the accuracy of touch display.

Figure 9:
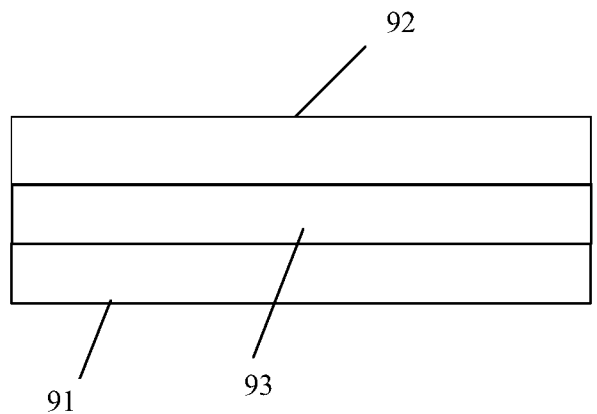
FIG. 9 is a schematic structural diagram of a touch display panel according to an embodiment of the present application.

The specification further provides a touch display panel according to an embodiment of the present application, and reference is made to FIG. 9, which is a schematic structural diagram of a touch display panel according to an embodiment of the present application. The touch display panel includes: a first substrate 91 and a second substrate 92 disposed opposite to the first substrate 91; and a liquid crystal layer 93 between the first substrate 91 and the second substrate 92.

The first substrate 91 may be the touch display substrate according to any one of the above embodiments, and the first substrate 91 may be an array substrate or a color film substrate.

The touch display substrate described above is applied to the touch display panel according to one embodiment of the application, and thus the accuracy of the touch detection is improved.

Figure 10:
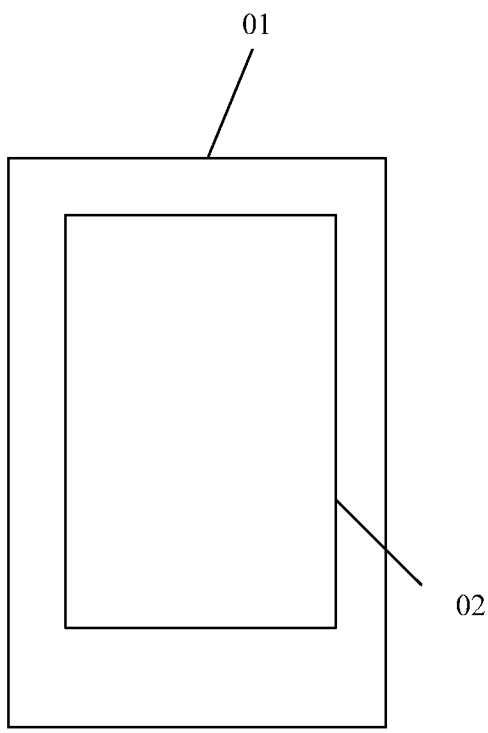
FIG. 10 is a schematic structural diagram of an electronic device according to an embodiment of the present application.

The specification further provides an electronic device according to an embodiment of the present application, and reference is made to FIG. 10, which is a schematic structural diagram of a an electronic device according to an embodiment of the present application. The electronic device 01 includes a touch display panel 02 according to the above embodiment.

The touch display panel according to the above embodiment is applied to the electronic device according to the embodiment of the application, and thus the accuracy of the touch detection is improved. The electronic device may be, in some implementations, a mobile phone, a computer or a TV.

Those skilled in the art are able to perform or apply the disclosure according to the above description of the disclosed embodiment. It is apparent for those skilled in the art to modify the embodiments in many ways. The general principle suggested by the application can be achieved in other embodiments without departing from the spirit or scope of the disclosure. Therefore, the disclosure should not be limited by these embodiments shown in the specification, but conform to the widest scope in accordance with the principle and the novelty disclosed in the disclosure.

The invention claimed is:

1. A touch display substrate, comprising:
a substrate plate comprising a plurality of TFT transistors;
a first insulating layer disposed on the plurality of TFT transistors;
a common electrode layer on the first insulating layer, comprising a matrix of touch display electrodes insulated from each other and arranged in a first and a second directions perpendicular to each other, wherein the matrix of touch display electrodes increase areas sequentially along a first direction of the array, wherein the matrix comprises at least 3 rows and 3 columns;
a second insulating layer disposed on the first common electrode layer; and
a touch display wire layer comprising a plurality of touch display wires disposed on the second insulating layer above the common electrode layer, along the first direction in parallel, separated from each other in the second direction;
wherein a single electrode of the matrix of touch display electrodes electrically connects to one wire of the plurality of touch display wires in an one-to-one correspondence through via holes in the second insulating layer; and wherein each of the touch display electrodes in the first direction overlays more of the plurality of touch display wires from the increasing areas;
wherein a difference between areas of any two adjacent touch display electrodes in the first direction of the array is less than or equal to 4%.

2. The touch display substrate according to claim 1, further comprising a wire shielding electrode disposed above the plurality of touch display wires, wherein the wire shielding electrode is partially overlaying with the plurality of touch display wires.

3. A touch display panel, comprising:
a first substrate, and a second substrate disposed opposite to the first substrate; and
a liquid crystal layer disposed between the first substrate and the second substrate, wherein the first substrate comprises:
a substrate plate comprising a plurality of TFT transistors;
a first insulating layer disposed on the plurality of TFT transistors;
a common electrode layer formed on the first insulating layer, comprising a matrix of touch display electrodes insulated from each other and arranged in rows and columns, wherein the matrix comprises at least 3 rows and 3 columns, wherein the touch display electrodes in the matrix increase areas sequentially along a first direction of the array;
a second insulating layer disposed on the first common electrode layer; and
a touch display wire layer comprising a plurality of touch display wires disposed on the second insulating layer above the common electrode layer, along the first direction in parallel, separated from each other in a second direction;
wherein a single electrode of the matrix of touch display electrodes electrically connects to one wire of the plurality of touch display wires in an one-to-one correspondence through via holes in the second insulating layer; and wherein the touch display electrodes matrix in the first direction overlays more of the plurality of touch display wires from the increasing areas; and
wherein a difference between areas of any two adjacent touch display electrodes in the first direction of the array is less than or equal to 4%.

4. An electronic device, comprising a driving circuit and the touch display panel according to claim 3.

5. A touch display substrate, comprising:
a substrate plate comprising a plurality of TFT transistors;
a first insulating layer disposed on the plurality of TFT transistors;
a touch display wire layer comprising a plurality of touch display wires disposed along a first direction in parallel on the first insulating layer, separated from each other in a second direction;
a second insulating layer disposed on the first insulating layer covering the plurality of touch display wires; and
a common electrode layer formed on the second insulating layer, comprising a matrix of touch display electrodes insulated from each other and arranged in at least 3 rows and at least 3 columns, wherein the touch display electrodes in the matrix increase areas sequentially along the first direction;
wherein a single electrode of the matrix of touch display electrodes electrically connects to one wire of the plurality of touch display wires in an one-to-one correspondence through via holes in the second insulating layer; and wherein the touch display electrodes in the first direction overlays more of the plurality of touch display wires from the increasing areas; and
wherein a difference between areas of any two adjacent touch display electrodes in the first direction of the array is less than or equal to 4%.

6. The touch display substrate according to claim 5, further comprising a wire shielding electrode disposed above the plurality of touch display wires, wherein the wire shielding electrode is partially overlaying with the plurality of touch display wires.

\* \* \* \* \*